(12) United States Patent
Nefzger et al.

(10) Patent No.: US 8,273,846 B2
(45) Date of Patent: Sep. 25, 2012

(54) POLYURETHANE AND POLYURETHANE UREA ELASTOMERS BASED ON POLYCARBONATE POLYOLS

(75) Inventors: Hartmut Nefzger, Pulheim (DE); James-Michael Barnes, Breitscheid (DE); Manfred Schmidt, Dormagen (DE); Jens Krause, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 605 days.

(21) Appl. No.: 12/168,957

(22) Filed: Jul. 8, 2008

(65) Prior Publication Data
US 2009/0018256 A1  Jan. 15, 2009

(30) Foreign Application Priority Data
Jul. 11, 2007 (DE) .......................... 10 2007 032 343

(51) Int. Cl.
*C08G 18/00* (2006.01)
(52) U.S. Cl. ................ 528/85; 528/59; 528/65; 528/80; 528/370; 528/367; 528/372; 558/260; 558/265; 558/266
(58) Field of Classification Search .................. 528/370, 528/367, 372, 85, 59, 65, 80; 558/260, 265, 558/266
See application file for complete search history.

(56) References Cited

U.S. PATENT DOCUMENTS

| 4,533,729 A | * | 8/1985 | Newland et al. | ............... 528/371 |
| 4,808,691 A | | 2/1989 | König et al. | |
| 2004/0092699 A1 | * | 5/2004 | Ueno et al. | ...................... 528/66 |

FOREIGN PATENT DOCUMENTS

| DE | 3717060 A1 | 12/1988 |
| DE | 602 02 449 T2 | 12/2005 |
| JP | 2001323042 A * | 11/2001 |

OTHER PUBLICATIONS

Tanaka, H., et al "Mechanical Properties of Thermoplastic Polyurethanes Containing Aliphatic Polycarbonate Soft Segments with Different Chemical Structures", Polymer Engineering and Science, Jun. 2002, vol. 42, No. 5, pp. 1333-1349.
International Search Report, Jun. 22, 2009.

* cited by examiner

*Primary Examiner* — Ling Choi
*Assistant Examiner* — Michael L Leonard
(74) *Attorney, Agent, or Firm* — Connolly Bove Lodge & Hutz LLP

(57) ABSTRACT

The present invention relates to high-quality polyurethane and polyurethane urea elastomers which exhibit unique combinations of processing characteristics, oxidation resistance, mechanical and mechanical/dynamic properties in particularly demanding applications. These polyurethane elastomers and polyurethane urea elastomers are based on novel polycarbonate polyols.

2 Claims, No Drawings

POLYURETHANE AND POLYURETHANE UREA ELASTOMERS BASED ON POLYCARBONATE POLYOLS

CROSS REFERENCE TO RELATED PATENT APPLICATION

The present patent application claims the right of priority under 35 U.S.C. §119 (a)-(d) of German Patent Application No. 10 2007 032 343.5, filed Jul. 11, 2007.

BACKGROUND OF THE INVENTION

The present invention relates to high-quality polyurethane (PU) elastomers and polyurethane urea elastomers which exhibit unique combinations of processing characteristics, oxidation resistance, mechanical and mechanical/dynamic properties in particularly demanding applications. These polyurethane elastomers and polyurethane urea elastomers are based on novel polycarbonate polyols.

Polyurethane elastomers were first sold commercially over 60 years ago by Bayer MaterialScience AG under the trade name Vulkollan®, based on 1,5-naphthalene diisocyanate (NDI, which is commercially available from Bayer Material-Science AG), a long-chain polyester polyol and a short-chain alkanediol.

In addition to polyester polyols, polyether polyols, polycarbonate polyols and polyether ester polyols are also used as long-chain polyols. The choice of long-chain polyol is determined primarily by the requirements of the individual application. The concept of "customised properties" is also used in this connection. For example, polyether polyols are used if hydrolysis resistance and low-temperature properties are a priority. Polyester polyols have advantages over polyether polyols in terms of mechanical properties and UV stability. However, their low microbe resistance is a disadvantage. Polycarbonate polyols combine to some extent the advantages of polyether polyols and polyester polyols, but they are relatively expensive in comparison.

The advantages of polycarbonate polyols lie in particular in their UV stability, hydrolysis resistance and their mechanical properties.

The disadvantage of polyester polyols and polycarbonate polyols and their mixed types, polyester carbonate polyols, as compared with polyether polyols lies in their generally less advantageous low-temperature characteristics. This is due to structural factors and is based on the elevated polarity of carbonyl groups, which normally means that polyester polyols and polycarbonate polyols are partially crystalline, whereas polyether polyols, especially the propylene oxide-based types as the commercially largest group, are amorphous. For partially crystalline systems the relation between glass transition temperature ($T_g$) and melt temperature ($T_m$) is described by the known empirical rule established by Beaman and Bayer (M. D. Lechner, K. Gehrke and E. H. Nordmeier, Makromolekulare Chemie, Birkhäuser Verlag 1993, page 327)

$$T_g = 2/3 T_m \qquad (I)$$

For example, if polycarbonate polyols have melt temperatures for the partially crystalline components of around 70° C. (343° K), the glass transition temperatures of the amorphous regions are in the order of magnitude of −43° C. (230° K). These values largely also apply if the polycarbonate polyols are present as soft segment polyols in segmented multi-block copolyurethanes, e.g. in the form of thermoplastic polyurethane elastomers (TPU) or polyurethane cast elastomers in integrated form. It is clear from this that it is desirable to have polycarbonate polyols which have a melting range as low as possible. On the one hand, this simplifies processing, and on the other, the working temperature range is extended down to lower temperatures as a consequence of the glass transition temperature, which is likewise reduced.

The upper limit of the working temperature range is determined by the thermal properties of the rigid segments (e.g. urethane, urea, isocyanurate groups, etc.), i.e. the structural elements present in the polyisocyanate building blocks.

The disadvantage of using 1,6-hexanediol as the diol component for polycarbonate polyols or polyadipate polyols, for example, as used in polyurethane chemistry, is the elevated viscosity with otherwise identical characteristic values (molecular weight and functionality).

There have been a number of attempts to modify the melting range of hexanediol polycarbonate polyol, which in industry is the most important polycarbonate polyol for polyurethane elastomers, in such a way as to cover the specific requirements of as many applications as possible. For example, in DE-A 3717060 part of the hexanediol is replaced by hexanediol ether units, for example, leading to a reduced crystalline proportion as compared with pure hexanediol polycarbonate polyol and a melting range shifted to lower temperatures. The disadvantage of this process, however, is that the incorporation of ether groupings has a negative influence on the oxidation and heat ageing resistance, as a result of which some important applications are not viable.

H. Tanaka and M. Kunimura (Polymer Engineering and Science, vol. 42, no. 6, page 1333 (2002)) indicate a way of eliminating at least the aforementioned disadvantage by using 1,6-hexanediol and 1,12-dodecanediol to produce copolycarbonate polyols which have markedly lower melt temperatures than their homopolycarbonate polyols. With the aid of the measurement technique they were using, they measured the melting point of hexanediol polycarbonate polyol at 47.4° C. and that of 1,12-dodecane polycarbonate polyol at 65.5° C., whereas a copolycarbonate polyol with a composition of 70 parts by weight of hexanediol to 30 parts by weight of 1,12-dodecanediol melts at 29.1° C.; this represents a lowering of the melting range by 18.3° C. and 36.3° C., respectively, as compared with the homopolymers. The values for the heat of fusion [J/g] behave in a similar manner, displaying a minimum when the polycarbonate polyol consists of 70 parts of hexanediol and 30 parts of 1,12-dodecanediol.

In spite of these in principle promising approaches, which incidentally were also used on thermoplastic polyurethane elastomers synthesised therefrom, it has so far not been possible to implement this method on an industrial scale, or at least not to any significant extent.

A substantial reason for this is that 1,12-dodecanediol in particular is so expensive that the resulting price of the polycarbonate polyol or copolycarbonate polyol and hence ultimately of the polyurethane elastomer is so high that the advantages that might arise from using 1,12-dodecanediol in whole or in part are outweighed.

This means that any technical advantages would be achieved at too high a cost.

Therefore, an object of the present application was to provide polyurethanes which do not have the aforementioned disadvantages.

SUMMARY OF THE INVENTION

The invention relates to polycarbonate polyols having an OH value of 50 to 80 mg KOH/g and an average functionality of 1.9 to 2.2. These polycarbonate polyols are the reaction product of (1) a mixture comprising
  A) one or more α,ω-alkanediols having 4 to 8 carbon atoms,
  B) technical dodecanediol which comprises (1) 30 to 50 wt. % of 1,12-dodecanediol, (2) 5 to 20 wt. % of diols having fewer than 10 carbon atoms and (3) no diols having more than 12 carbon atoms, and wherein the technical dodecanediol is present in an amount of from 15 wt. % to 85 wt. %, based on the total weight of the mixture of A) and B),
  and
  C) 0 to 10 wt. %, based on the total weight of the mixture of A), B) and C), of one or more alkanols having 4 to 10 carbon atoms and a hydroxyl functionalities of 1 to 3;
with
(2) a carbonyl component from the group consisting of diaryl carbonates, dialkyl carbonates and carbonyl chloride.

A process for the preparation of these novel polycarbonate polyols is also provided.

The present invention also relates to NCO prepolymers prepared from these novel polycarbonate polyols with a polyisocyanate component, and to a process for the preparation of these NCO prepolymers.

In addition, this invention relates to polyurethane elastomers and/or polyurethane urea elastomers comprising the reaction product of the NCO prepolymers prepared from the polycarbonate polyols and one or more chain extenders. A process for the preparation of these elastomers is also provided herein.

DETAILED DESCRIPTION OF THE INVENTION

The molecular weight of the polycarbonate polyols of the present invention is in the range of from about 1200 to about 2500 Da. The viscosity of these polycarbonate polyols, measured at 75° C., is between about 900 and about 2600 mPas, and these have an average functionality in the range of from about 1.9 to about 2.2. This is achieved by optionally adding monools or polyols to the mixture used to prepare the polycarbonate polyols. Examples of suitable polyols and monools in this connection include but are not limited to 1,1,1-trimethylol propane and 1-octanol, respectively. Functionalities below 2 can also be achieved by not completely reacting the dialkyl carbonates and/or diaryl carbonates used so that alkyl carbonate and/or aryl carbonate end groups are formed.

The reaction of (1) the mixture of components A), B) and optionally C), with (2) the carbonyl component takes place by methods known to the person skilled in the art. Carbonyl chloride (i.e. phosgene), dialkyl carbonates and/or diaryl carbonates can be used as (2) the carbonyl component. Dimethyl carbonate and/or diphenyl carbonate are preferred carbonyl components.

In accordance with the present invention, the polycarbonate polyols can then be processed further, preferably via a prepolymer stage, to form polyurethane (PU) materials. These polyurethane materials can be prepared by reacting the polycarbonate polyols of the invention, optionally with the added use of short-chain organic compounds having hydroxyl end groups and/or amino end groups and/or water, with polyisocyanates, preferably diisocyanates.

The invention also provides NCO prepolymers having an NCO group content of 3 to 15 wt. %. These NCO prepolymers are obtained by reacting polycarbonate polyols of the invention, and a polyisocyanate selected from the group consisting of 1,5-naphthalene diisocyanate, 2,4'-diphenylmethane diisocyanate (2,4'-MDI), 4,4'-diphenylmethane diisocyanate (4,4'-MDI), mixtures of 2,4'-diphenylmethane diisocyanate and 4,4'-diphenylmethane diisocyanate, carbodiimide-/uretonimine-modified diphenylmethane diisocyanate derivatives, polynuclear homologues of the diphenylmethane series, diisocyanatotoluenes, hexamethylene diisocyanate, isophorone diisocyanate, with the isocyanate component being present in a molar excess. More specifically, it is preferred that the polyisocyanate and the polycarbonate polyols are present in amounts such that the molar ratio of NCO to OH groups is from 2:1 to 10:1.

The present invention also provides polyurethane elastomers and/or polyurethane urea elastomers which are obtained by reacting NCO prepolymers as described herein, with an isocyanate-reactive blend of (i) one or more aliphatic diols having primary hydroxyl groups and number-average molecular weights of 62 to 202, optionally, in amounts of 0-10 wt. %, based on the weight of the aliphatic diols, of compounds selected from the group consisting of short-chain polyols with functionalities >2 to 4, higher-molecular-weight polyols with a functionality of 2 and polycarbonate polyols according to the invention, or (ii) one or more aromatic diamine-type chain extenders selected from the group consisting of 4,4'-methylene-bis-(2-chloroaniline) (MBOCA), 3,3',5,5'-tetraisopropyl-4,4'-diamino-diphenylmethane, 3,5-dimethyl-3',5'-diisopropyl-4,4'-diaminophenylmethane, 3,5-diethyl-2,4-toluene diamine, 3,5-diethyl-2,6-toluene diamine (DETDA), 4,4'-methylene-bis-(3-chloro-2,6-diethylaniline), 3,5-dimethylthio-2,4-toluene diamine, 3,5-dimethylthio-2,6-toluene diamine and 3,5-diamino-4-chlorobenzoic acid isobutyl ester, optionally, in the presence of water, and/or further auxiliary substances and additives.

Suitable aliphatic diols to be used herein include butanediol, hexanediol, cyclohexanediol, 2,2'-thiodiethanol or mixtures thereof. These diols are preferred.

If water is used as a chain extender and/or as a blowing agent, the polyurethane elastomers preferably have densities of 0.3 to 0.9 g/cm$^3$.

The polyurethane and polyurethane urea elastomers are preferably produced by the casting method, wherein there are substantially two different processes. The first is the NCO prepolymer method, in which long-chain polyol (i.e. the polycarbonate polyol) and polyisocyanate in stoichiometric excess are reacted to form a prepolymer having NCO groups, and then subjecting this prepolymer to chain extension with a short-chain organic compound having hydroxyl end groups or amino end groups, and/or water. Secondly, PU cast elastomers can also be produced by the one-shot method, in which long-chain polyol and short-chain organic compounds are mixed with hydroxyl end groups or amino end groups, and/or water, and then reacted with a polyisocyanate.

In addition to polyurethane cast elastomers, polyurethane elastomers suitable for thermoplastic processing can also be produced from the polycarbonate polyols of the invention by methods known to the person skilled in the art.

In addition to the components described above as suitable for the present invention, the conventional catalysts and auxiliary agents can also be used in the production of the polyurethane or polyurethane urea elastomers.

Examples of suitable catalysts are trialkylamines, diazabicyclooctane, tin dioctoate, dibutyl tin dilaurate, N-alkyl morpholine, lead octoate, zinc octoate, calcium octoate, magnesium octoate, the corresponding naphthenates, p-nitrophenolate, etc.

Examples of suitable stabilizers are Brønsted acids and Lewis acids including, for example, hydrochloric acid, benzoyl chloride, organomineral acids, for example, dibutyl phosphate, also adipic acid, malic acid, succinic acid, racemic acid or citric acid.

Examples of UV stabilizers and hydrolysis stabilizers are, for example, 2,6-dibutyl-4-methylphenol and carbodiimides.

Incorporable dyes which can likewise be used are those which have Zerewitinoff-active hydrogen atoms that can react with NCO groups.

Other auxiliary substances and additives include emulsifiers, foam stabilizers, cell regulators and fillers. An overview can be found in G. Oertel, Polyurethane Handbook, $2^{nd}$ edition, Carl Hanser Verlag, Munich, 1994, chapter 3.4.

The use of the polyurethane elastomers according to the invention lies in the area of technical components, and is thus, extremely wide-ranging. It includes, for example, roller coatings, electrical encapsulation, pipeline pigs, knives, wheels, rollers, screens, etc.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Composition of the Raw Materials Used in the Examples

T12DD: Technical dodecanediol commercially available from Invista which comprised a mixture of (1) 30 to 50 wt. % of 1,12-dodecanediol, (2) 5 to 20 wt. % of one or more diols having few than 10 carbon atoms and (3) no diols having more than 12 carbon atoms
DPC: diphenyl carbonate
Hexanediol: 1,6-Hexanediol commercially available from Aldrich
4,4'-MDI: 4,4'-diphenylmethane diisocyanate
1,5-NDI: 1,5-naphthalene diisocyanate
Magnesium hydroxide carbonate: as pentahydrate commercially available from Aldrich
Dibutyl phosphate: dibutyl phosphate commercially available from Aldrich
Crosslinker RC 1604: a crosslinker commercially available from Rheinchemie
Butanediol: 1,4-Butanediol from Aldrich
Baytec® VPPU 0385: Ether group-containing polycarbonate polyol from Bayer MaterialScience AG with a hydroxyl value of 56 mg KOH/g and a functionality of 2
TMP: 1,1,1-Trimethylolpropane from Aldrich
Crosslinker 10GE32: Crosslinker from Bayer MaterialScience AG The viscometer used to determine the viscosity of materials in the examples was a MCR 51 from Anton Paar.

A Lambda 25 UV/Vis spectrometer from Perkin Elmer was used for the photometric determination of aromatic end groups (e.g. phenoxy and phenyl carbonate) and of free phenol in polycarbonate polyols.

A) Production of Polycarbonate Polyols

Example A3

According to the Invention 2946 g (15.34 mol) of T12DD, 1264 g (10.71 mol) of hexanediol (i.e. 70 wt. % of T12DD based on the combined weight of T12DD and hexanediol) and 4952 g (23.14 mol) of DPC and 160 mg of magnesium hydroxide carbonate were heated to 180° C. for 90 minutes in a distillation apparatus under nitrogen whilst stirring. The mixture was then cooled to 110° C., a vacuum (15 mbar) was applied and phenol was removed by distillation. When phenol distillation slowed down, the bottom temperature was increased in small increments over 10 hours to reach 200° C., the overhead temperature not being permitted to rise above 80° C. Distillation was carried out for approx. 1 hour at 200° C. and 15 mbar, and then for about an additional 1 hour at 200° C. and under a pressure of below 1 mbar. In this phase, phenol residues were driven out of the column with a hot air blower. After cooling to around 80° C., a sample was taken. The OH value, the end groups (by photometry) and the viscosity were determined. The mixture was then neutralised at 80° C. by stirring in 960 mg of dibutyl phosphate.

OH value: 60 mg KOH/g

Viscosity: 1180 mPas (75° C.)

End groups: Phenol: 0.02 wt. %, phenoxy and phenyl carbonate: not detectable

Examples A1, A2 and A4 were carried out in the same way as Example A3. The relevant data for each Example can be found in Table 1.

TABLE 1

| | | Polycarbonate polyols | | | |
| --- | --- | --- | --- | --- | --- |
| | | Example | | | |
| | | A.1. (C) | A.2. | A.3. | A.4. (C) |
| T12DD content | [wt. %] | 0 | 30 | 70 | 10 |
| OH value | [mg KOH/g] | 56.4 | 54.9 | 60.0 | 58.9 |
| Viscosity [75° C.] | [mPas] | 2850 | 2180 | 1180 | 790 |

(C) = Comparison

B) Production of MDI prepolymers:

Example B3

According to the Invention 1850 g (7.4 mol) of 4,4'-MDI were introduced into a 6 liter three-necked flask with heating mantle, stirrer and internal thermometer under a nitrogen blanket at 50° C. whilst stirring. Then, 3001 g of a polycarbonate polyol from Example A3 which was preheated to 80° C. were added over approx. 10 minutes whilst stirring. Stirring was then continued under nitrogen at 80° C. The reaction was completed after 2 hours. The NCO group content was 10.0 wt. % and the viscosity was 2050 mPas (at 70° C.).

The NCO prepolymer was stored in a glass flask at room temperature and remained liquid and resistant to sedimentation for a period of over 3 months.

Examples B1, B2 and B4 were performed in the same way as Example B3, except that instead of polycarbonatediol A3, polycarbonate diols A1, A2 and A4 were used in these Examples, respectively. The relevant data can be found in Table 2.

TABLE 2

NCO prepolymers based on polycarbonate polyols A1 to A4 with NCO contents of 10 wt. %

|  |  | Example | | | |
|---|---|---|---|---|---|
|  |  | B1 (C) | B2 | B3 | B4 (C) |
| Polycarbonatediol |  | A1 (C) | A2 | A3 | A4 (C) |
| Viscosity (at 70° C.) | [mPas] | 4220 | 3180 | 2050 | 1447 |
| Resistant to crystallisation (at room temperature) |  | No | Yes | Yes | No |
| Resistant to sedimentation (after 3 months and at room temperature) |  | No*) | No | Yes | No*) |

*)These samples solidify completely when left to stand at room temperature
(C) = Comparison Table 2 shows that prepolymer B3 which was produced from polycarbonate polyol A3 in accordance with the present invention, has particularly favorable properties. In particular, Example B3 has a viscosity below 2500 mPas (70° C.) and exhibits good resistance to crystallisation and sedimentation at room temperature. The prepolymer B2 is still perfectly useable but has a higher viscosity than prepolymer B3. In the case of prepolymer B1 (comparison) and prepolymer B4 (comparison) produced from polycarbonate polyol A1 (comparison) and polycarbonate polyol A4 (comparison), a sediment quickly forms at room temperature, and both NCO prepolymers solidify completely when stored at room temperature.

C) Production of Cast Elastomers:

1) Chain Extension with 1,4-butanediol:

100 parts of a prepolymer (from Example B) preheated to 70° C. and degassed were stirred for 30 seconds with 10.15 parts of 1,4-butanediol. The reacting melt was poured into metal molds heated to 115° C. and annealed at 110° C. for 24 hours. After storing at room temperature for 21 days the mechanical data was determined (see Table 3). In the formulations in Table 3, all of the amounts shown are parts by weight.

2) Chain Extension with Crosslinker RC 1604:

100 parts of a prepolymer (from Example B) preheated to 70° C. and degassed were stirred for 30 seconds with 26.5 parts of crosslinker RC 1604 (crosslinker temperature: 105° C.). The reacting melt was poured into metal molds heated to 115° C. and annealed at 110° C. for 24 hours. After storing at room temperature for 21 days the mechanical data was determined (see Table 3). In the formulations in Table 3, all of the amounts shown are parts by weight.

TABLE 3

Production and properties of polyurethane and polyurethane urea elastomers by reacting the MDI prepolymers with butanediol or crosslinker 1604

|  |  |  | Example | | | | | | | |
|---|---|---|---|---|---|---|---|---|---|---|
|  |  |  | C1-1 (C) | C2-1 (C) | C1-2 | C2-2 | C1-3 | C2-3 | C1-4 (C) | C2-4 (C) |
| Formulation: | Prepolymer |  | B1 (C) | B1 (C) | B2 | B2 | B3 | B3 | B4 (C) | B4 (C) |
|  | MDI prepolymer | [parts] | 100 | 100 | 100 | 100 | 100 | 100 | 100 | 100 |
|  | NCO content of prepolymer | [%] | 10.01 | 10.01 | 10 | 10 | 10.0 | 10 | 10.02 | 10.02 |
|  | Prepolymer viscosity (70° C.) | [mPas] | 4220 | 4220 | 3180 | 3180 | 2050 | 2050 | 1447 | 1447 |
|  | Crosslinker 1604 | [parts] | — | 26.5 | — | 26.5 | — | 26.5 | — | 26.5 |
|  | 1,4-Butanediol | [parts] | 10.15 | — | 10.15 | — | 10.15 | — | 10.15 | — |
| Processing: | Prepolymer temperature | [° C.] | 70 | 70 | 70 | 70 | 70 | 70 | 70 | 70 |
|  | Crosslinker temperature | [° C.] | 23 | 105 | 23 | 105 | 23 | 105 | 23 | 105 |
|  | Casting time | [s] | 125 | 28 | 130 | 48 | 120 | 40 | 135 | 43 |
|  | Retraction time | [min] | 7 | 3 | 6 | 3 | 5 | 3 | 7 | 3 |
|  | Table temperature | [° C.] | 116 | 116 | 116 | 116 | 116 | 116 | 116 | 116 |
|  | Mold temperature | [° C.] | 110 | 110 | 110 | 110 | 110 | 110 | 110 | 110 |
|  | Release time | [min] | 24 | 24 | 24 | 24 | 24 | 24 | 24 | 24 |
| Mechanical properties: | | | | | | | | | | |
| DIN 53505 | Shore A |  | 97 | 100 | 97 | 100 | 97 | 100 | 98 | 100 |
| DIN 53505 | Shore D |  | 49 | 71 | 49 | 71 | 48 | 69 | 50 | 70 |
| DIN 53504 | Tensile modulus 100% | [MPa] | 15.56 | 31.31 | 15.51 | 29.87 | 12.52 | 26.72 | 12.23 | 24.74 |
| DIN 53504 | Tensile modulus 300% | [MPa] | 35.15 | — | 26.97 | — | — | — | — | — |
| DIN 53504 | Yield stress | [MPa] | 37.91 | 40.67 | 27.63 | 37.58 | 14.76 | 32.89 | 12.86 | 29.56 |
| DIN 53504 | Ultimate elongation | [%] | 364 | 186 | 351 | 171 | 205 | 205 | 201 | 212 |
| DIN 53515 | Graves | [kN/m] | 123 | 170 | 97 | 159 | 77 | 156 | 65 | 141 |
|  | Impact resilience | [%] | 43 | 56 | 48 | 57 | 51 | 57 | 49 | 57 |
| DIN 53516 | Abrasion (DIN) | [mm$^3$] | 23 | 44 | 23 | 52 | — | — | — | — |
| DIN 53420 | Density | [g/mm$^3$] | 1.200 | 1.210 | 1.177 | 1.185 | — | — | — | — |
| DIN 53517 | Compression set 22° C. | [%] | 18.3 | 59.6 | 18.3 | 58.9 | 21.9 | 65.1 | 29.2 | 63.4 |
| DIN 53517 | Compression set 70° C. | [%] | 33.0 | 82.9 | 38.9 | 86.0 | 43.3 | 84.5 | 47.8 | 85.4 |

D) Production of Cast Elastomers Based on 1,5-Naphthalene Diisocyanate:

93.3 parts of a polycarbonate polyol (from Example A3) preheated to 125° C. were stirred with differing amounts of 1,5-naphthalene diisocyanate (1,5-NDI), a vacuum of approx. 15 mbar was applied until constancy of temperature was reached. Differing amounts of chain extenders were then stirred in for 30 seconds. The reacting melt was poured into metal molds heated to 115° C. and annealed at 110° C. for 24 hours. After storing at room temperature for 21 days the mechanical data was determined (see Table 4B). In the formulations in Table 4A, all of the amounts shown are parts by weight.

E) Production of Cast Elastomers (not According to the Invention)

Baytec® VPPU 0385 is a commercial product based on 1,6-hexanediol and diphenyl carbonate.

The polycarbonate Baytec® VPPU 0385 was reacted with 1,5-NDI to form an NCO prepolymer. This prepolymer was then chain extended to obtain the NDI cast elastomer, in which the chain extension was performed with 1,4-butanediol. Preparation of the cast elastomer was as described in Example D). 100 parts by weight of polycarbonate polyol, 18 parts by weight of 1,5-NDI and 2 parts by weight of 1,4-butanediol were used.

TABLE 4A

Production and properties of cast elastomers based on polyol A3 and NDI

| | | | D1 | D2 | D3 | D4 | D5 | D6 | D7 | D8 | D9 | D10 |
|---|---|---|---|---|---|---|---|---|---|---|---|---|
| | Polyol A3 | [parts] | 93.3 | 93.3 | 93.3 | 93.3 | 93.3 | 93.3 | 93.3 | 93.3 | 93.3 | 93.3 |
| | 1,5-NDI | [parts] | 18 | 25 | 21 | 27 | 30 | 18 | 18 | 18 | 18 | 18 |
| | 1,4-Butanediol | [parts] | 2 | 5 | 3.4 | 5.8 | — | 2 | 2.3 | 2 | 2.3 | 2.3 |
| | TMP | [%] | — | — | — | — | — | 10 | 20 | 30 | 40 | 60 |
| | Crosslinker 10GE32 | [parts] | — | — | — | — | 9.5 | — | — | — | — | — |
| Processing: | Polyol temperature | [° C.] | 122 | 125 | 126 | 130 | 133 | 122 | 122 | 122 | 122 | 122 |
| | Reaction time | [min] | 10 | 9 | 7 | 8 | 7 | 10 | 10 | 9 | 11 | 10 |
| | Temperature maximum | [° C.] | 132.8 | 128.5 | 126.5 | 127.9 | 127.1 | 129.4 | 129.1 | 129.4 | 130 | 128.7 |
| | Casting time | [s] | 105 | 35 | 60 | 25 | 165 | 105 | 105 | 110 | 180 | 190 |
| | Setting time | [min] | 16 | 7 | 7 | 5 | 9 | 17 | 19 | 23 | 25 | 60 |
| | Table temperature | [° C.] | 116 | 116 | 116 | 116 | 116 | 116 | 116 | 116 | 116 | 116 |
| | Mold temperature | [° C.] | 110 | 110 | 110 | 110 | 110 | 110 | 110 | 110 | 110 | 110 |
| | Release time | [min] | — | — | — | — | — | — | — | — | — | — |
| | Post-cure temperature | [° C.] | 110 | 110 | 110 | 110 | 110 | 110 | 110 | 110 | 110 | 110 |
| | Post-cure time | [h] | 24 | 24 | 24 | 24 | 24 | 24 | 24 | 24 | 24 | 24 |
| | Prep viscosity (120° C.) | [mPas] | 4865 | 1625 | 2615 | 1310 | 1040 | — | — | — | — | — |

TABLE 4B

Production and properties of cast elastomers based on polyol A3 and NDI

| | | | D1 | D2 | D3 | D4 | D5 | D6 | D7 | D8 | D9 | D10 |
|---|---|---|---|---|---|---|---|---|---|---|---|---|
| | | | Mechanical properties: | | | | | | | | | |
| DIN 53505 | Shore A | | 94 | 97 | 96 | 97 | 98 | 93 | 92 | 92 | 91 | 85 |
| DIN 53505 | Shore D | | 38 | 44 | 41 | 47 | 49 | 36 | 35 | 35 | 33 | 28 |
| DIN 53504 | Tensile modulus 100% | [MPa] | 8.70 | 13.62 | 10.85 | 13.97 | 14.68 | 8.13 | 7.82 | 7.56 | 7.06 | 5.52 |
| DIN 53504 | Tensile modulus 300% | [MPa] | 16.09 | 19.03 | 15.84 | 19.09 | 19.38 | 15.27 | 15.20 | 15.58 | 16.70 | 16.63 |
| DIN 53504 | Yield stress | [MPa] | 26.99 | 23.58 | 23.92 | 21.38 | 23.03 | 26.83 | 26.02 | 27.37 | 26.66 | 23.86 |
| DIN 53504 | Ultimate elongation | [%] | 459 | 468 | 509 | 388 | 422 | 451 | 417 | 414 | 376 | 336 |
| DIN 53515 | Graves | [kN/m] | 62 | 80 | 21 | 86 | 106 | 53 | 47 | 41 | 31 | 75 |
| | Impact resilience | [%] | 62 | 62 | 62 | 62 | 57 | 60 | 59 | 58 | 56 | 50 |
| DIN 53516 | Abrasion (DIN) | [mm$^3$] | 27 | 30 | 29 | 37 | 30 | 27 | 29 | 29 | 35 | 34 |
| DIN 53517 | Compression set 22° C. | [%] | 18.3 | 18.4 | 19.7 | 22.3 | 20.8 | 18.9 | 18.1 | 18.0 | 16.5 | 15.2 |
| DIN 53517 | Compression set 70° C. | [%] | 33.6 | 33.5 | 34.3 | 36.8 | 35.8 | 35.2 | 34.0 | 34.6 | 33.0 | 30.0 |
| DIN 53517 | Compression set 100° C. | [%] | 51.2 | 48.3 | 46.8 | 50.4 | 48.5 | 50.9 | 48.4 | 48.7 | 48.8 | 40.6 |
| DIN 53517 | Compression set 120° C. | [%] | 83.7 | 77.6 | 72.5 | 76.2 | 73.6 | 93.7 | 91.8 | 83.9 | 84.9 | 82.0 |

F) Hydrolysis and Hot-Air Ageing of NDI Cast Systems

It was able to be shown that the systems according to the invention have excellent properties in terms of their behavior with regard to hydrolysis and hot-air ageing, and are superior to conventional systems.

TABLE 5

Hydrolysis characteristics and hot-air ageing (as determined by DIN 53508) of the NDI cast elastomer according to the invention of Example D1)

| | | \[days\] | | | | | |
|---|---|---|---|---|---|---|---|
| | | 0 | 7 | 14 | 21 | 42 | 56 | 63 |

| | | 0 | 7 | 14 | 21 | 42 | 56 | 63 |
|---|---|---|---|---|---|---|---|---|
| Storage in water at 100° C. | | | | | | | | |
| Shore A | | 94 | 91 | 90 | 90 | 91 | 92 | 92 |
| Tensile modulus 100% | [MPa] | 8.70 | 6.10 | 6.03 | 5.26 | 6.22 | 6.17 | 6.29 |
| Tensile modulus 200% | [MPa] | 11.71 | 8.19 | 7.72 | 7.15 | 7.27 | 7.45 | 7.22 |
| Tensile modulus 300% | [MPa] | 16.09 | 10.10 | 9.13 | 8.72 | 7.60 | 8.07 | 7.61 |
| Yield stress | [MPa] | 26.99 | 16.83 | 12.53 | 11.06 | 7.51 | 8.17 | 7.54 |
| Ultimate elongation | [%] | 459 | 653 | 615 | 515 | 330 | 350 | 317 |
| Storage in air at 150° C. | | | | | | | | |
| Shore A | | 94 | 96 | 91 | 89 | 89 | 90 | 87 |
| Tensile modulus 100% | [MPa] | 8.70 | 6.63 | 6.08 | 5.69 | 5.57 | 5.75 | 5.69 |
| Tensile modulus 200% | [MPa] | 11.71 | 8.30 | 7.75 | 7.56 | 7.39 | 7.43 | 7.45 |
| Tensile modulus 300% | [MPa] | 16.09 | 9.74 | 9.33 | 9.33 | 9.17 | 8.97 | 8.85 |
| Yield stress | [MPa] | 26.99 | 17.50 | 16.90 | 15.99 | 14.77 | 13.29 | 13.42 |
| Ultimate elongation | [%] | 459 | 684 | 709 | 622 | 567 | 566 | 599 |

Table 5 shows that the NDI cast elastomer DI also withstands extreme loads. The sharpest drop in mechanical data occurs right at the start of loading, in other words between 0 and 7 days. This behavior is typical of such tests, however. From this point onwards, the system according to the invention changes only marginally and displays virtually constant values even in a hot-air ageing test at 150° C. over 9 weeks at tensile modulus values of 100%, 200% and 300%. By contrast, a comparable, conventional system exhibits a greater drop in mechanical data after just 14 days at only 130° C. (see Table 6). The same applies with regard to storage in water.

TABLE 6

Hydrolysis characteristics and hot-air ageing (as determined by DIN 53508) of an NDI cast elastomer not according to the invention - Example E)

| | | [days] | | | |
|---|---|---|---|---|---|
| Storage in water at 80° C. | | 0 | 3 | 14 | 28 |
| Shore A | | 89 | 88 | 87 | 87 |
| Tensile modulus 100% | [MPa] | 5.4 | 5.8 | 4.9 | 4.9 |
| Tensile modulus 300% | [MPa] | 9.5 | 10.2 | 8.4 | 8.1 |
| Yield stress | [MPa] | 42.4 | 35.6 | 30.3 | 26.0 |
| Ultimate elongation | [%] | 638 | 603 | 679 | 740 |

| | | [days] | | |
|---|---|---|---|---|
| Storage in air at 130° C. | | 0 | 3 | 14 |
| Shore A | | 89 | 87 | 85 |
| Tensile modulus 100% | [MPa] | 5.4 | 5.5 | 5.2 |
| Tensile modulus 300% | [MPa] | 9.5 | 8.6 | 8.0 |
| Yield stress | [MPa] | 42.4 | 29.2 | 22.7 |
| Ultimate elongation | [%] | 638 | 748 | 723 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane elastomer and/or polyurethane urea elastomer comprising the reaction product of
   (I) NCO prepolymers having an NCO content of 3 to 15 wt. % and which comprise the reaction product of
      (A) polycarbonate polyols having an OH number of 50 to 80 mg KOH/g and an average functionality of 1.9 to 2.2 which are obtained by reacting
         (1) a mixture consisting essentially of
            a) 15 wt. % to 85 wt. %, based on the mixture of a) and b), of one or more α,ω-alkanediols which have from 4 to 8 carbon atoms,
            b) 15 wt. % to 85 wt. %, based on the mixture of a) and b), of a dodecanediol mixture which consists essentially of
               (i) 30 to 50 wt. % of 1,12-dodecanediol,
               (ii) 30 to 50 wt. % of undecandiol, and
               (iii) 5-20 wt. % of one or more diols having from 6 to 10 carbon atoms, and
            c) 0 to 10 wt. %, based on the total weight of the mixture of a), b) and c), of one or more alkanols having from 4 to 10 carbon atoms and hydroxyl functionalities of 1 or 3;
         with
         (2) a carbonyl component selected from the group consisting of diaryl carbonates, dialkyl carbonates and carbonyl chloride, and (B) a polyisocyanate which is selected from the group consisting of 1,5-naphthalene diisocyanate, 2,4'-diphenylmethane diisocyanate, 4,4'-diphenylmethane diisocyanate, mixtures of 2,4'-diphenylmethane diisocyanate and 4,4'-diphenylmethane diisocyanate, carbodiimide-/uretonimine-modified diphenylmethane diisocyanate derivatives, polynuclear homologues of the diphenylmethane diisocyanate series, diisocyanatotoluenes, hexamethylene diisocyanate, isophorone diisocyanate and mixtures thereof, wherein (B) said polyisocyanate is present in a molar excess;

with (II) a composition comprising:

(A') one or more aliphatic diols having primary hydroxyl groups and number-average molecular weights of 62 to 202, and in amounts of 0 to 10 wt. %, based on the total weight of aliphatic diols, of one or more compounds selected from the group consisting of short-chain polyols with functionalities >2 to 4, higher-molecular-weight polyols with a functionality of 2 and polycarbonate polyols of (A), optionally, in the presence of water and/or further auxiliary substances and additives;

or (B') one or more aromatic diamine-type chain extenders selected from the group consisting of 4,4'-methylene-bis-(2-chloroaniline) (MBOCA), 3,3',5,5'-tetraisopropyl-4,4'-diaminodiphenylmethane, 3,5-dimethyl-3',5'-diisopropyl-4,4'-diaminophenylmethane, 3,5-diethyl-2,4-toluene diamine, 3,5-diethyl-2,6-toluene diamine (DETDA), 4,4'-methylene-bis-(3-chloro-2,6-diethylaniline), 3,5-dimethylthio-2,4-toluene diamine, 3,5-dimethylthio-2,6-toluene diamine, 3,5-diamino-4-chlorobenzoic acid isobutyl ester and mixtures thereof, optionally, in the presence of water and/or further auxiliary substances and additives.

2. A process for the preparation of polyurethane elastomers and/or polyurethane urea elastomers, comprising reacting:

(I) NCO prepolymers having an NCO content of 3 to 15 wt. % and which comprise the reaction product of (A) polycarbonate polyols having an OH number of 50 to 80 mg KOH/g and an average functionality of 1.9 to 2.2 which are obtained by reacting (1) a mixture consisting essentially of a) 15 wt. % to 85 wt. %, based on the mixture of a) and b), of one or more α,ω-alkanediols which have from 4 to 8 carbon atoms, b) 15 wt. % to 85 wt. %, based on the mixture of a) and b), of a dodecanediol mixture which consists essentially of (i) 30 to 50 wt. % of 1,12-dodecanediol,
(ii) 30 to 50 wt. % of undecandiol, and
(iii) 5-20 wt. % of one or more diols having from 6 to 10 carbon atoms, and c) 0 to 10 wt. %, based on the total weight of the mixture of a), b) and c), of one or more alkanols having from 4 to 10 carbon atoms and hydroxyl functionalities of 1 or 3;

with (2) a carbonyl component selected from the group consisting of diaryl carbonates, dialkyl carbonates and carbonyl chloride, and (B) a polyisocyanate which is selected from the group consisting of 1,5-naphthalene diisocyanate, 2,4'-diphenylmethane diisocyanate, 4,4'-diphenylmethane diisocyanate, mixtures of 2,4'-diphenylmethane diisocyanate and 4,4'-diphenylmethane diisocyanate, carbodiimide-/uretonimine-modified diphenylmethane diisocyanate derivatives, polynuclear homologues of the diphenylmethane diisocyanate series, diisocyanatotoluenes, hexamethylene diisocyanate, isophorone diisocyanate and mixtures thereof, wherein (B) said polyisocyanate is present in a molar excess;

with (II) a composition comprising:

(A') one or more aliphatic diols having primary hydroxyl groups and number-average molecular weights of 62 to 202, and in amounts of from 0 to 10 wt. %, based on the total weight of aliphatic diols, of one or more compounds selected from the group consisting of short-chain polyols with functionalities >2 to 4, higher-molecular-weight polyols with a functionality of 2 and polycarbonate polyols of (A), optionally, in the presence of water and/or further auxiliary substances and additives;

or (B') one or more aromatic diamine-type chain extenders selected from the group consisting of 4,4'-methylene-bis-(2-chloroaniline) (MBOCA), 3,3',5,5'-tetraisopropyl-4,4'-diaminodiphenylmethane, 3,5-dimethyl-3',5'-diisopropyl-4,4'-diaminophenylmethane, 3,5-diethyl-2,4-toluene diamine, 3,5-diethyl-2,6-toluene diamine (DETDA), 4,4'-methylene-bis-(3-chloro-2,6-diethylaniline), 3,5-dimethylthio-2,4-toluene diamine, 3,5-dimethylthio-2,6-toluene diamine, 3,5-diamino-4-chlorobenzoic acid isobutyl ester and mixtures thereof, optionally, in the presence of water and/or further auxiliary substances and additives.

* * * * *